US005898400A

United States Patent [19]
Jones et al.

[11] Patent Number: 5,898,400
[45] Date of Patent: Apr. 27, 1999

[54] OBSERVATION INSTRUMENT AND REMOTE CONTROL HANDLE ASSEMBLY

[75] Inventors: David W. Jones, Beaver Dam; Carroll D. Williams, Owensboro, both of Ky.

[73] Assignee: MPH Industries, Inc., Owensboro, Ky.

[21] Appl. No.: 08/931,728

[22] Filed: Sep. 16, 1997

[51] Int. Cl.$^6$ .................................................. G01S 13/58
[52] U.S. Cl. ........................................................ 342/104
[58] Field of Search ............................. 342/104; 341/176

[56] References Cited

U.S. PATENT DOCUMENTS

| | | |
|---|---|---|
| 4,588,318 | 5/1986 | O'Brien et al. . |
| 4,935,742 | 6/1990 | Marin . |
| 5,159,345 | 10/1992 | Young . |
| 5,479,163 | 12/1995 | Samulewicz . |
| 5,491,464 | 2/1996 | Carter et al. . |
| 5,525,996 | 6/1996 | Aker et al. . |
| 5,528,245 | 6/1996 | Aker et al. . |
| 5,563,603 | 10/1996 | Aker et al. . |
| 5,565,871 | 10/1996 | Aker et al. . |
| 5,570,093 | 10/1996 | Aker et al. . |
| 5,598,162 | 1/1997 | Terashima et al. ............ 341/176 |

OTHER PUBLICATIONS

H.A.W.K. Traffic Safety Radar, pp. 1–4, May 1995.

*Primary Examiner*—Daniel T. Pihulic
*Attorney, Agent, or Firm*—King and Schickli

[57] ABSTRACT

A velocity/speed measurement radar unit incorporates a handle assembly for detachment from a base unit to allow for convertibility from a hand-held unit to a remote controlled radar unit. The removable handle assembly controls the operating parameters and secondary functions of the radar unit in a simple and user friendly manner. The operating parameters are established using multifunctional switches incorporated in the handle assembly, such as a trigger-type switch, rocker switches, and push button switches. The secondary functions are similarly controlled using a rotary encoder/push button switch combination. A microprocessor in the handle assembly receives inputs from the multifunctional switches and generates a corresponding control signal for transmission to the base unit. The handle assembly and base unit communicate via infra-red transmitters and receivers. The handle assembly is ergonomically designed to insure ease of use. The base unit is independently mounted when converted to the remote mode of operation.

37 Claims, 5 Drawing Sheets

Fig. 7

OBSERVATION INSTRUMENT AND REMOTE CONTROL HANDLE ASSEMBLY

TECHNICAL FIELD

The present invention relates to the field of observation instruments, and more particularly to an observation instrument incorporating a detachable control handle assembly for convertibility from a hand-held instrument to a remotely controlled mounted instrument.

BACKGROUND OF THE INVENTION

It is desirable for observation instruments, such as photographic cameras, television cameras, camcorders, speed measurement or vehicular traffic radar guns, and similar instruments to operate in either a hand-held configuration or a remotely controlled mounted configuration. For example, in the field of velocity/speed measurement radar systems, it is well known to mount a radar base unit and to utilize a remote control device connected to the base unit by a cable to control at least some of operating parameters of the radar system. One such radar system is the BEE mobile traffic radar system manufactured by MPH Industries, Inc., assignee of the present application. The remote control device of the BEE radar system utilizes a plurality of non-momentary switches as input devices in order to establish such control. Within the limited operating area of a typical police patrol vehicle, having the remote control device tethered by the cable can be both difficult and burdensome to work around. In addition to this shortcoming, the tethered remote control device limits the use of the radar system in a practical sense to the mounted configuration, such as on the dash of the patrol vehicle.

In order to overcome these limitations, others have resorted to more conventional types of remote control devices. These more conventional devices are similar in size, shape and structure, as well as operation, to the remote control devices presently utilized with such consumer goods as television sets, video cameras, video cassette recorders, compact disc players, and various other electronic and audio equipment. For example, U.S. Pat. No. 5,565,871 to Aker et al. teaches the use of one of these conventional remote control devices to establish some of the operating parameters of a dash mounted traffic radar system.

In use, control of the selected operating parameters is achieved by depressing one of a group of momentary switches, thus transmitting an infrared or UHF control signal for receipt by the radar base unit. Although these remote control devices are touted to eliminate the undesirable limitations of the tethered or cabled control devices, additional operational shortcomings become apparent during use. For example, as mentioned above these conventional remote control devices are designed specifically for use with dash mounted radar systems only. More importantly, the flat-shaped design and numerous momentary switches of this type of control device make it difficult for the operator to use.

Specifically, during mounted use with remote control operation, the operator must frequently direct his attention to the remote control device in order to insure proper switch selection and actuation. In effect, the operator must deal with operating switches that are in a different location and have a different feel than when the radar unit is operated directly by the operator. The mental process required to switch from one control mode to the other, not only slows the process, but is likely to lead to mistakes. Further, the operating parameters are not all controlled by the remote control device in these prior art devices, thus necessitating the operator to divide his/her attention between two sets of switches. This divided operation requires even more mental gymnastics that is still more likely to lead to slower and mistake prone operation. Of course, the potential difficulty in operation of the vehicle while on the move under such conditions is potentially even more serious.

Heretofore, the various input devices or switches on hand-held radar systems utilizing a pistol grip handle typically include only the target velocity or speed lock/release feature. The remaining input devices, such as the on/off, internal circuit test and volume control among others, are positioned on the rear display panel of the base unit. Typically, the operator must cease operating the system while establishing the desired operating parameters. These limitations in present hand-held radar systems also result in inefficient operation.

It is contemplated that these shortcomings and inefficiencies can be alleviated in the control of observation instruments, such as speed or vehicular traffic measurement radar systems, by incorporating a detachable handle assembly for convertibility from a hand-held configuration to a remotely controlled mounted configuration. Specifically, what is needed is a handle assembly with one set of input devices/switches that allows for complete control of an observation instrument, in either a first attached configuration, or in a second detached configuration where the base unit is remotely mounted.

SUMMARY OF THE INVENTION

Accordingly, it is a primary object of the present invention to provide an apparatus, and related method for improved operation of an observation instrument that overcomes the shortcomings and limitations of the prior art.

It is another object of the present invention to provide an improved detachable handle assembly for full control of an observation instrument, and a related method of converting and operating such a hand-held observation instrument to a remotely mounted instrument.

Another object of the present invention is to provide an observation instrument, such as a radar system, having a detachable handle assembly for establishing the full control, including operating parameters of the instrument, in either the hand-held configuration, or in the remote control configuration with the base unit separately mounted.

It is a related object of the present invention is to provide a handle assembly for attachment to and control of such an observation instrument and capable of receiving and displaying information.

It is still another object of the present invention to provide a velocity or speed measurement radar system having a detachable or removable handle assembly for controlling a base unit, thus allowing the system to operate in either a hand-held or a mounted configuration.

Another object of the present invention is to provide a removable handle assembly for a radar system capable of remotely controlling, as well as selecting and adjusting all of the operating parameters of the radar system.

Another object of the present invention is to provide a radar system including a detachable/removable handle assembly capable of transmitting control signals, including for set up of operating parameters to a base unit, either in a hand-held or a remote mounted configuration, or to a related peripheral device, such as to an external memory device for said system.

It is yet another object of the present invention to provide a detachable/removable handle assembly for transmitting all control signals, including for the operating parameters, of a radar base unit, and a related conversion/operation method, wherein is required only one set of input devices/switches to be manipulated, either in a hand-held configuration, or remotely in a mounted configuration of the base unit, and wherein said input devices/switches are designed and are laid out logically and ergonomically to enhance the ease of operation.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, there is provided an observation instrument including a handle assembly for attachment to and convertibility from a hand-held instrument to a remotely controlled mounted instrument. The handle assembly is detachable/removable through a coupler designed to accommodate easy conversion of the observation instrument from the hand-held to the mounted configuration.

The handle assembly includes a transmitter for transmitting the control signals to the observation instrument, including for set up of the operating parameters, either in the hand-held or the remote configuration. The control signals are generated by control circuitry in response to the operator's actuation of the various input devices/switches.

Specifically, the control circuitry includes a controller capable of monitoring the input devices and generating all control signals for transmission to the observation instrument. In accordance with an important aspect of the present invention, the control signals include a signal with information relating to the present state of the input devices. Advantageously, this method of continuously monitoring the input devices allows the operating parameters of the observation instrument to be updated upon each successive change, thus allowing missed or erroneous signals in the previous transmission to be corrected.

In accordance with another important aspect of the present invention, the observation unit includes a transmitter for transmitting information to the handle assembly in the mounted configuration. Accordingly, the handle assembly includes a receiver and a display. The display is advantageously positioned on the handle assembly such that the additional information is displayed for viewing and use by the operator.

In a further aspect of the present invention, the transmitters and receivers of the observation instrument and the handle assembly can be used in conjunction with various peripheral devices. For example, the control signal from the handle assembly and/or data signals from the observation instrument can be received by a peripheral device, such as a memory device.

In accordance with yet another important aspect of the present invention, the observation instrument is a Doppler-based velocity/speed measurement/vehicular traffic radar system including a radar base unit and a handle assembly that mounts the input devices/switches. The radar base unit is preferably a Doppler-type that operates to transmit and receive radar signals in order to determine the velocity or speed of a moving target, such as a vehicle.

As generally described above, the handle assembly includes a coupler for connection to or detachment from the base unit for conversion from a hand-held to a remotely controlled mounted configuration, plus input devices/switches and a transmitter. The input devices include both momentary and non-momentary switches for establishing the control including the set up of the operating parameters of the radar system.

One aspect of the present invention is the use of a momentary switch as one of the input devices. It is mounted on the ergonomically designed handle assembly so as to provide a high degree of ease of manipulation. This momentary switch controls the transmission of radar signals by the radar base unit. In the hand-held configuration, this switch offers the advantage that it allows only for momentary transmission of the radar signal to provide the operator protection against unnecessary and unwanted power drain. That is, when the switch is released, the operation of the radar unit is interrupted. In the alternative mounted configuration, the switch can be locked to allow continuous radar signal transmission by the radar base unit.

The handle assembly further includes a receiver and a display for receipt of information from the radar base unit or other peripheral devices. For example, target speeds received by the radar base unit can be received and displayed by the detached handle assembly. To provide this function the radar base unit includes a corresponding transmitter.

In accordance with yet another aspect of the present invention, a method is provided for converting and operating the observation instrument, such as the speed or traffic radar system, in a hand-held configuration or in a remote mounted configuration. More specifically, the method includes the initial steps of removing the handle assembly from the observation instrument and mounting the observation instrument a distance from the handle assembly. The observation instrument is activated, in the next step, using the handle assembly to establish the operating parameters, to generate corresponding control signals indicative of the established parameters, and to transmit the control signal to the base unit.

The method also includes the steps of converting a speed measurement radar system from a hand-held to a remotely controlled mounted unit, wherein the step of activating the radar system further includes establishing the operating parameters, generating a control signal stream indicative of the established parameters, and transmitting the control signals to a receiver on the radar base unit.

In accordance with an important aspect of the present invention, the step of establishing and inputing the operating parameters is accomplished by switching both momentary and non-momentary switches to their desired position or state. The control signal stream contains information pertaining to the present state of each switch, thus establishing the operating parameters. It is transmitted to the base unit each time a change occurs in any of the switch states. Advantageously, this method for establishing the operating parameters allows the handle assembly to remain idle, thereby conserving power, except when a change in state of one of the switches occurs. This allows the handle assembly to operate for longer periods of time between recharge operations. Additionally, the step of transmitting the control signal stream indicative of the operating parameters independently reestablishes the present state of each of the operating parameters. This allows for a simple check allowing missed or erroneous signals in the previous transmission to be corrected.

An additional step in the method includes receiving and displaying information transmitted by the observation instrument/radar base unit. The step of receiving information advantageously allows the handle assembly and base unit to fully communicate. Additionally, the received information is shown on a display that is advantageously positioned for ease of observation on the handle assembly.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serves to explain the principles of the invention. In the drawings:

FIG. 4 is an elevational side view of the Doppler-based radar system of the present invention including the base unit and the handle assembly coupled together, and illustrating in phantom the attachment/detachment operation of the handle assembly to/from the radar base unit;

Reference will now be made in detail to the present preferred embodiment of the invention, an example of which is illustrated in the accompanying drawings.

DETAILED DESCRIPTION OF THE INVENTION

Figures 1, 2:
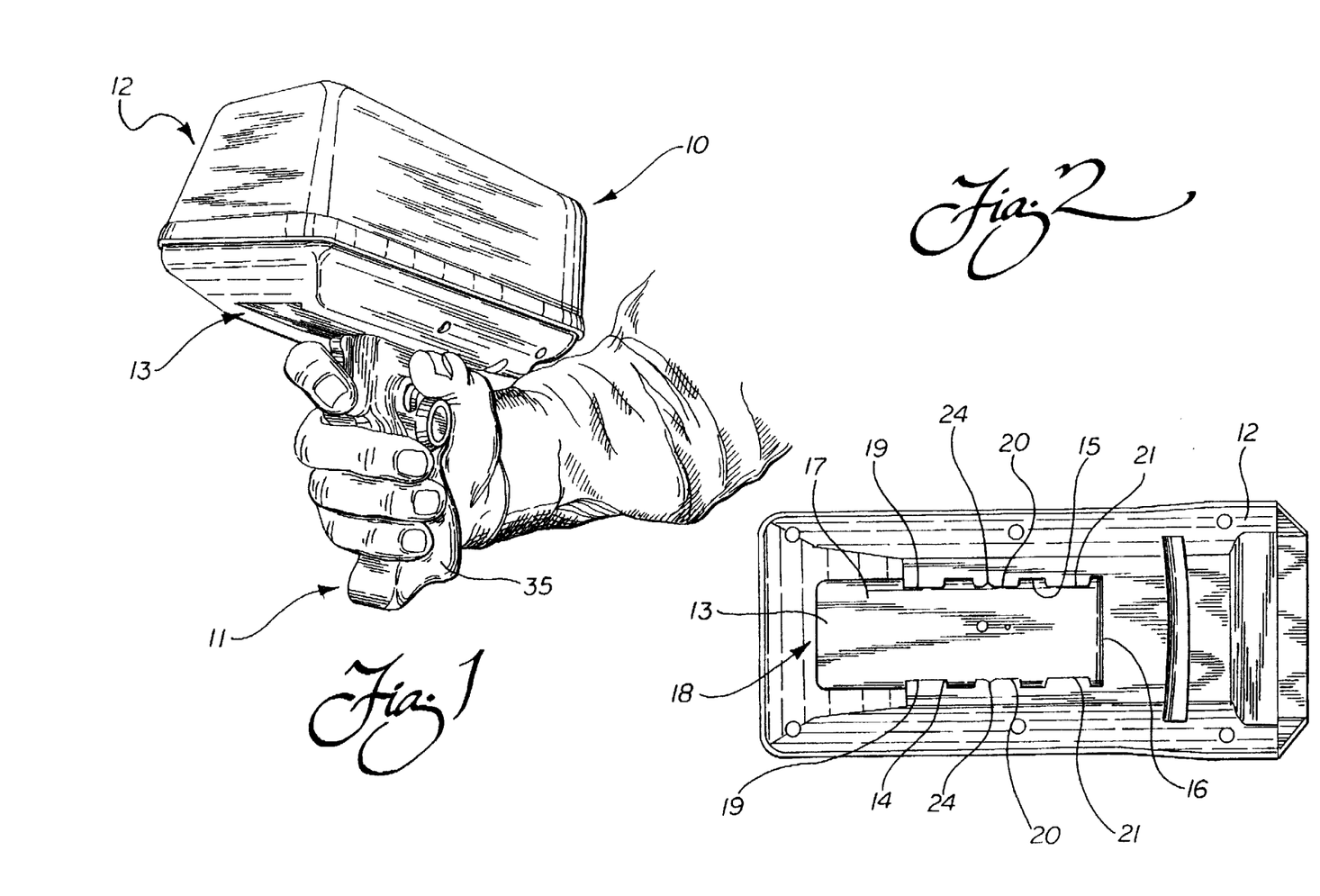
FIG. 1 is a perspective view of a preferred embodiment of the present invention in the form of a Doppler-based speed/traffic radar system and including the detachable handle assembly coupled as used in the hand-held mode of operation.
FIG. 2 is a bottom plan view of the radar base unit of the Doppler-based radar system of the preferred embodiment of the present invention.
Figure 2:
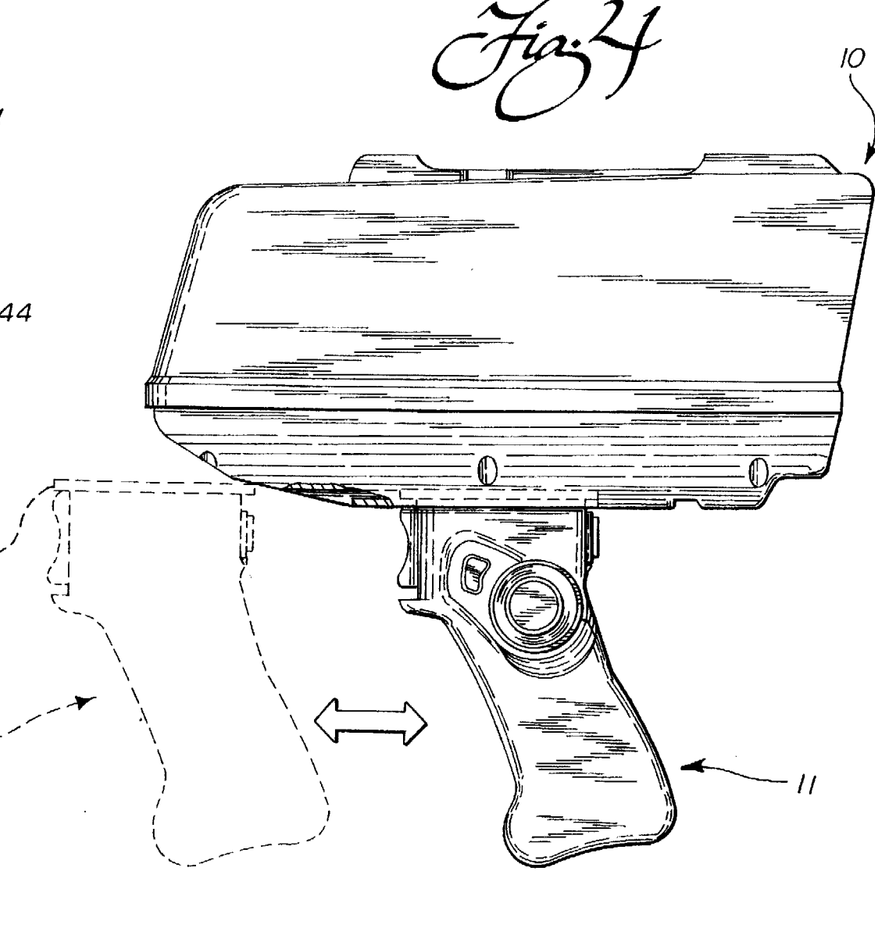

Reference is now made to FIG. 1 showing the Doppler-based velocity or speed/traffic radar system 10 of the preferred embodiment of the present invention. As should be appreciated the radar system 10 includes a handle assembly 11 for attachment to and control of a radar base unit 12 for convertibility from a hand-held to a remote radar system. It is to be understood that in accordance with the broader aspects of the invention, other observation instruments are contemplated as being within the principles and scope of the invention.

In this preferred embodiment, the radar base unit 12 includes a channel 13 opening at the forward end for receiving handle assembly 11 in the hand-held configuration (see FIG. 2 also). As best shown in FIG. 2, channel 13 is defined by a pair of opposing side walls 14, 15 and a rear wall 16. To accommodate the initial coupling of the handle assembly 11 into channel 13, the height of side walls 14, 15 tapers downwardly to meet a bottom surface 17 of the channel, thus forming a wider mouth 18 for receiving the handle assembly 11.

Three pairs of opposing tabs 19, 20, 21 integrally formed and extending from channel side walls 14, 15 guide the handle assembly 11 during the coupling and/or the decoupling process.

Figure 3:
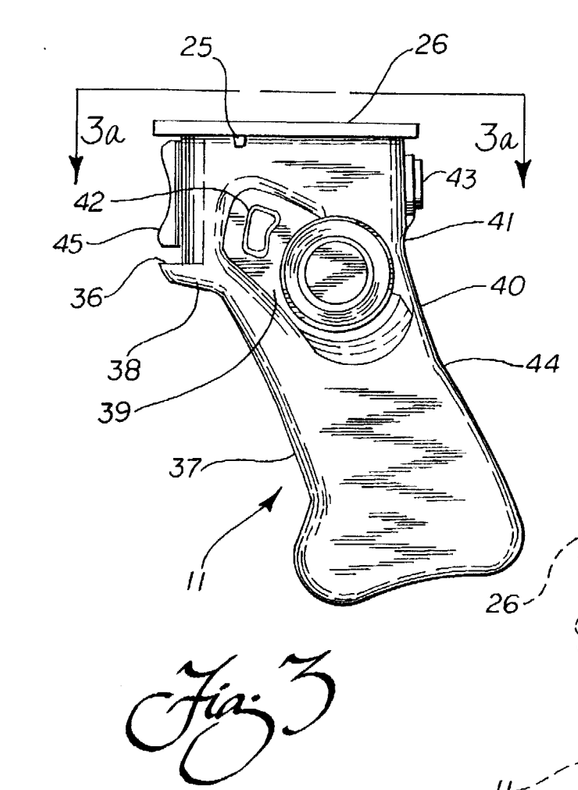
FIG. 3 is an elevational side view of the handle assembly of the radar system of the present invention.

A pair of opposing detents 24 firmly secure the handle assembly 11 in a locked position by engagement with corresponding beads 25 on the handle assembly during use in the hand-held mode of operation (see also FIG. 3). These beads 25 snap simultaneously into locking engagement with the detents 24 during coupling, thereby firmly securing handle assembly 11 to the radar base unit 12.

Figure 3A:
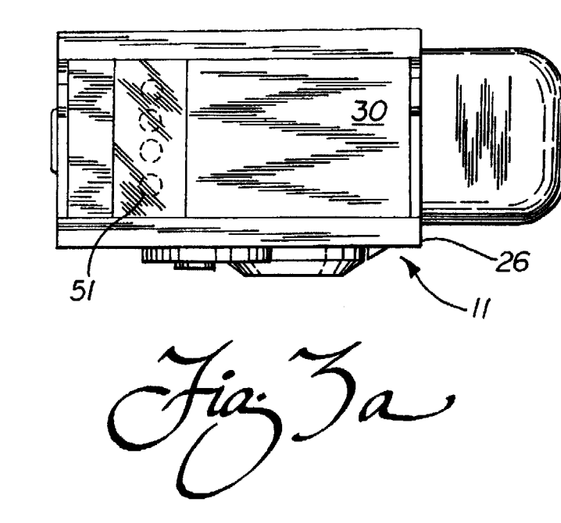
FIG. 3a is a top plan view of the handle assembly of the radar system of the present invention.

A coupler plate 26 is integrally formed atop, and extends outwardly in each direction from the handle assembly 11 in the preferred embodiment. As illustrated in FIG. 4, the coupler plate 26 is what supports the handle assembly 11 between the side walls 14, 15 in the coupled position on the base unit 11. As shown in FIG. 3A, the coupler plate 26 includes a center transparent window 30 to allow passage of infrared (IR) light, for a purpose to be explained below.

As clearly illustrated in FIGS. 1 and 3, the handle assembly 11 is ergonomically designed to not only rest comfortably in the hand of the operator but to allow logical and advantageously positioning of the input devices/switches, as mentioned above. This allows the operator to command full control of the radar system 10, including to input the desired operating parameters of the radar system 10 using only the index finger and thumb. The remaining fingers and palm of the hand are therefore available to firmly grasp the handle assembly 11, thus providing comfortable, stable, and controlled operation. Since according to the invention, the handle assembly 11 is used for control in either the hand-held, or in the remote mode of operation, reliable and accurate operation is always assured.

As shown in FIG. 3, integrally formed ledge 36 projects outwardly from front face 37 of the handle assembly. Arcuate bottom surface 38 of ledge 36 is specifically designed to allow the handle assembly 11 to be supported comfortably atop the user's middle finger in the hand-held/remote configurations. Similarly, integrally formed and laterally projecting platform 39 with a semicircular ridge 40 fits in the cusp between thumb and the palm. A combined rotary encoder/push button switch 41 is aligned with the top surface of the ridge 40. Since the ridge 40 encloses approximately two-thirds of the circumference of the rotary encoder 41, it provides protection against inadvertent operation by the middle finger as it wraps around the handle assembly 11. Only the upper peripheral portion of the rotary encoder/switch 41 is thus advantageously exposed to the operator's thumb for easy operation.

As further shown in FIG. 3, the remaining input devices/switches are each advantageously positioned. Specifically, a push button switch 42 is positioned on top of platform 39, thus also preventing inadvertent operation by the middle finger while remaining easily accessible to the thumb of the operator. Also, a rocker-type switch 43 is positioned on a rear face 44 of the handle assembly. The switch 43 is advantageously positioned to allow for easy operation by the operator's thumb in the handheld/remote configurations.

A trigger-type switch 45 is positioned on the forward face 37 of the handle assembly centered above integrally formed ledge 36. This placement advantageously provides the operator a solid tactile feel upon actuation. The trigger switch 45 is spring biased to an extended first position and is actuated by the operator's pointer finger to a second or third depressed position. The switch positions and method of use of trigger-type switch 45, as well as each of the input devices described above will be discussed in greater detail below.

Figure 5:
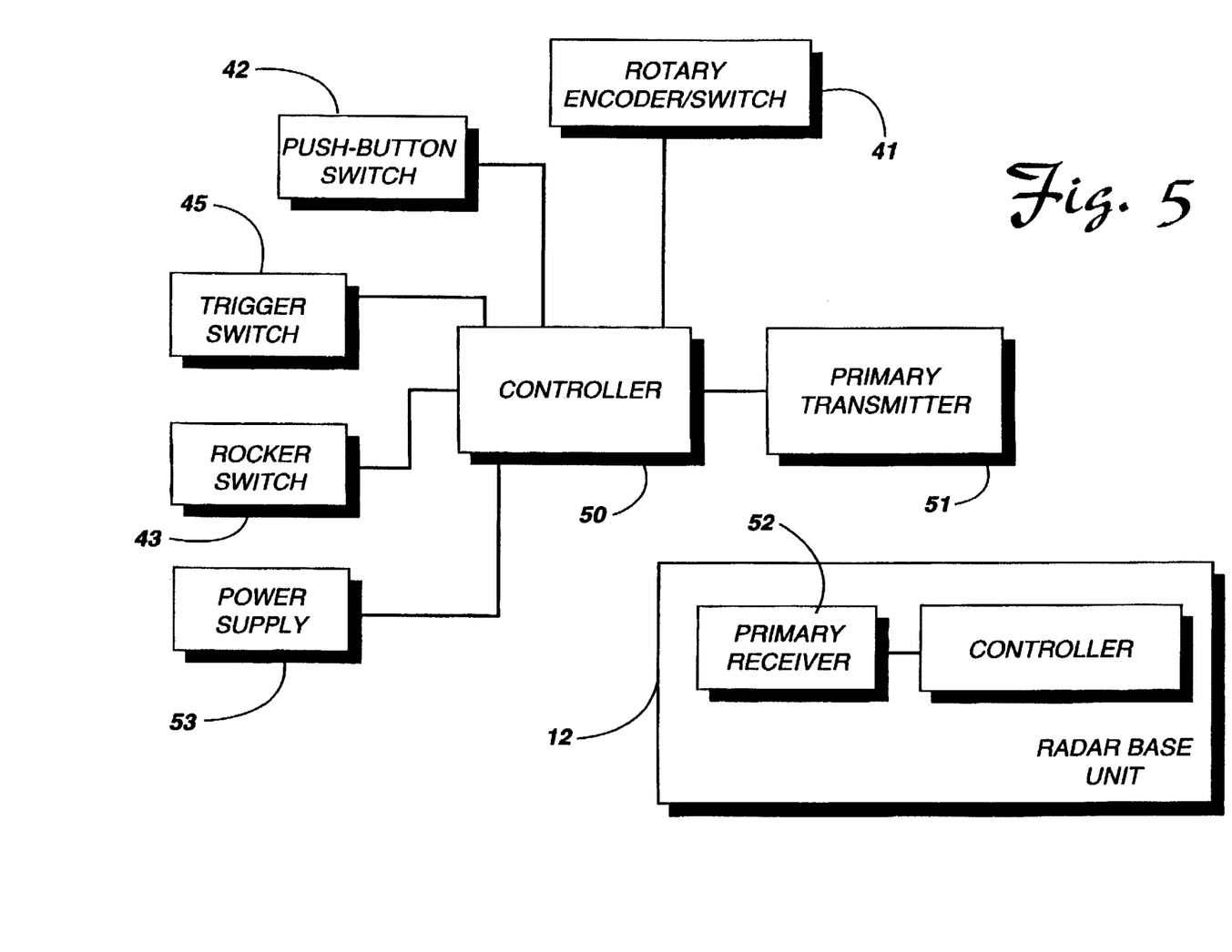
FIG. 5 is a schematic block diagram of the electrical circuit incorporated into the handle assembly of the radar system.

As shown in FIG. 5, controller 50 receives input signals from each of the input devices described above. In the preferred embodiment of the present invention, the controller is a microprocessor, such as a Microchip, Inc. 16C54 microprocessor. Upon receiving an input signal from one of the input devices, the controller 50 generates a control signal stream which is fed to primary transmitter 51 for transmission to the radar base unit 12. The transmitter in the present preferred embodiment is an infrared transmitter. However, it should be appreciated that any type of signal transmitter can be utilized, for example, an alternate embodiment may include FM, UHF or ultrasonic transmitters.

More specifically, the control signal in the preferred embodiment comprises a string of binary data bits representative of the present state of the input devices. For example, a 14-bit control signal might contain two start bits, a toggle bit, a parity bit, four momentary switch command bits, and four nonmomentary state bits. Advantageously, by retransmitting all of the control information, signals missed during the previous transmission or erroneous signals are corrected upon each subsequent operation of an input device. In addition, the non-momentary switch states do not have to be continuously transmitted, thus allowing controller 50 to place itself in a dormant state to preserve power provided by power supply 53.

Figure 6:
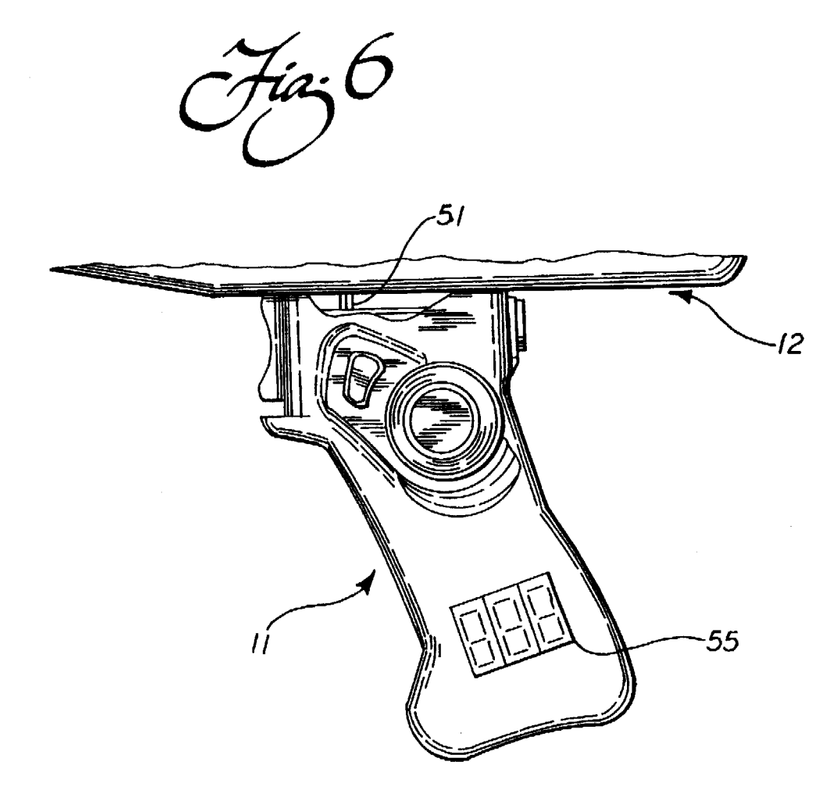
FIG. 6 is a partial elevational side view of an alternate embodiment of the radar system including the handle assembly with a display for conveying information received from the radar base unit to the operator.
Figure 7:
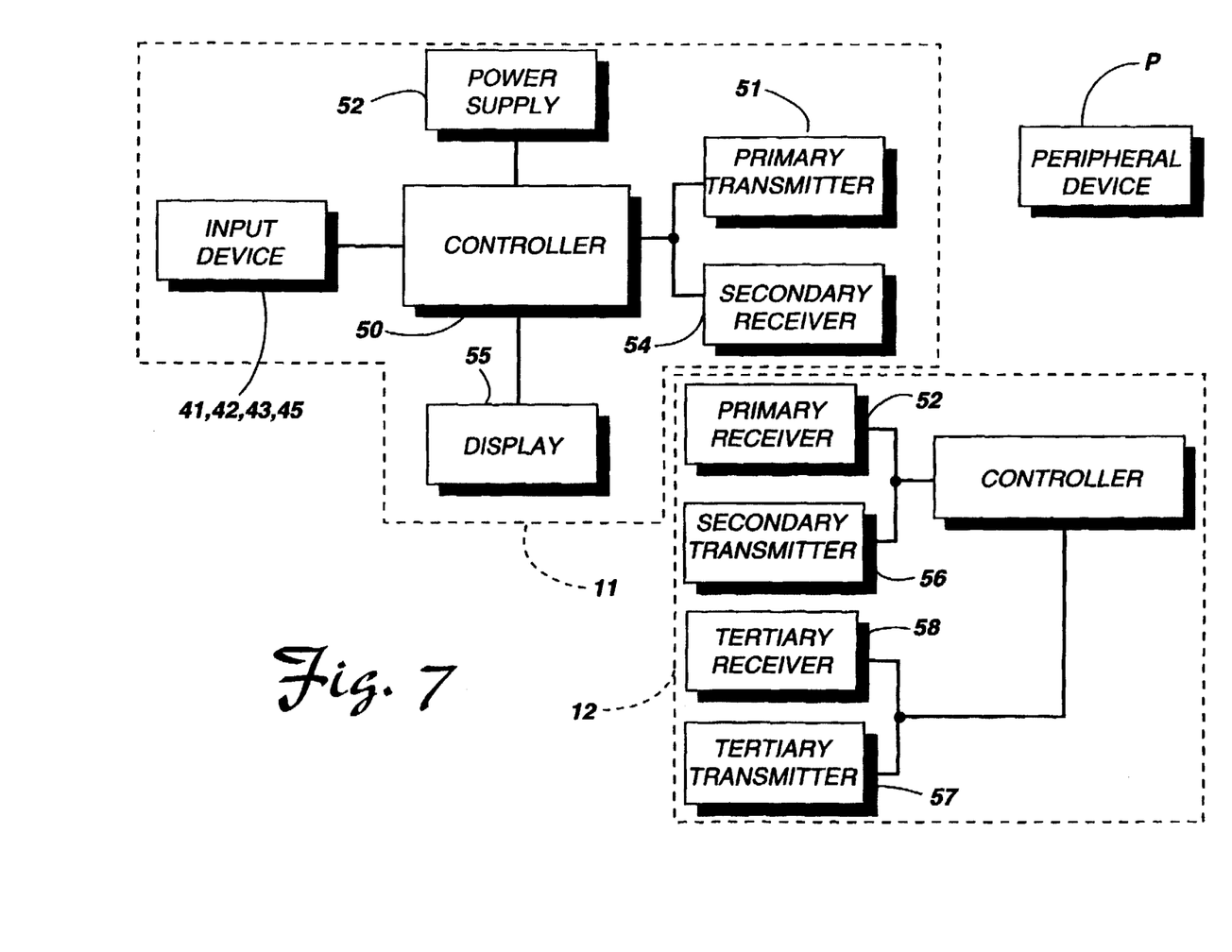
FIG. 7 is a combined schematic block diagram of the preferred embodiment of the radar system of the present invention, including the base unit, handle assembly and peripheral device.

As shown in FIGS. 6 and 7, an alternate embodiment of the Doppler-based radar system of the present invention includes a secondary receiver 54 and a display 55 in handle assembly 11. Display 55 is advantageously positioned on the left side of the handle assembly for conveniently viewing of the data received from a secondary transmitter 56 of the radar base unit. Display 55 is a liquid crystal display, in the preferred embodiment, capable of displaying three seven segment digits. Various other displays known in the art may also be utilized to display additional information including all of the data typically displayed by radar systems, such as target and patrol speeds and secondary operational characteristics.

As further shown in FIG. 7, various peripheral devices P may be used with the radar system. For example, handle assembly 11 or radar base unit 12 can transmit information/ data to a printer or a memory storage device having a corresponding receiver. For example, the data signal may contain the operational settings of the radar system, all acquired target speeds, date and time of day among others. Similarly, information can be received by the handle assembly or the radar base unit.

Also shown in FIG. 7, the radar base unit 12 includes a tertiary transmitter 57 and a tertiary receiver 58. The tertiary transmitter 57 and receiver 58 operate in the same manner described above for the secondary transmitter 56 and primary receiver 52. More specifically, the tertiary transmitter 57 and receiver 58 are included to enhance performance of the radar system during use in the remote mode of operation. Accordingly, transmitter 57 and receiver 58 can be positioned on the radar base unit to achieve the best results depending upon the mounted placement of the radar base unit.

METHOD OF USE

In operation, to attach the handle assembly to the base unit, the proximal end of coupler plate 26 is positioned within the channel mouth 18 (see FIGS. 2 and 4). As the coupler plate enters channel 13, the opposing tab pairs guide the handle assembly until beads 23 are received by detents 24, thus firmly securing the handle assembly in locked engagement.

In the hand-held configuration (FIG. 1), communications between the radar base unit 12 and the handle assembly 11 are conducted through infrared transmitters and receivers. Specifically, primary transmitter 51, positioned in the handle assembly, transmits control signal streams to the base unit. A corresponding receiver 54 is positioned in the base unit and receives the control signal stream through a hole in the channel 13.

The handle assembly is normally in standby mode when the trigger switch 45 is in the normal first extended position. Depressing and holding trigger switch 45 in its second position places the radar unit in a momentary transmit mode of operation. Releasing the trigger to the first position returns the radar system 10 to standby mode.

Trigger switch 45 is further operable in a third depressed position to lock the velocity/speed of the desired target presently displayed by the radar base unit 12. Advantageously, this provides a quick and convenient method of locking the desired target speed. Releasing the trigger switch from the third position back to the second position returns the radar system 10 to the momentary transmit mode for continued monitoring of targets. Depressing trigger switch 45 to the third position relocks a new target speed, thereby replacing the originally locked speed.

As described above, rocker switch 43 is operable to select between the various modes of operation of the radar system. In the preferred embodiment of the present invention, the center switch position represents a stationary mode of operation. In stationary mode, the radar system 10 processes the radar return signals in accordance with signal strength. Specifically, the radar system searches for the return signal having the strongest magnitude. This signal, or more precisely the frequency of this signal, is then converted to the desired units of speed measurement.

Similarly in the preferred embodiment, the right side switch position represents a moving/same direction mode of operation. This mode is selected when the target vehicles are traveling in the same direction as the patrol vehicle. As a result, the target vehicle signal frequency, and ultimately its velocity or speed, is determined by the difference in frequency between the patrol vehicle return signal and the target vehicle return signal. The target vehicle signal frequency may represent a speed that is lower or higher than that of the patrol vehicle depending on the speed of the target vehicle relative to the patrol vehicle. Thus, the operator has the option of using faster or slower same direction processing.

In the preferred embodiment, the radar base unit 12 defaults to a configuration where the target vehicle is presumed to be moving faster than the patrol vehicle. Therefore, the frequency/speed of the target vehicle is obtained by adding the target vehicle signal frequency to the frequency of the patrol vehicle signal. If, on the other hand, the target vehicle is moving at a slower rate than the patrol vehicle, then push button switch 42 is depressed, thus indicating to the base unit to determine the target vehicle speed by subtracting the frequency of the target vehicle signal from that of the patrol vehicle signal and converting the result to the desired speed units.

The left side switch position represents a moving/opposite direction mode of operation. This mode is selected when the target vehicle is traveling in a direction opposite to that of the patrol vehicle. As a result, the target vehicle frequency and ultimately its speed are determined by substrating the frequency of the patrol vehicle signal from the combined target and patrol signal frequencies.

In the stationary or moving/opposite direction modes of operation, the speed of the fastest target as determined by the radar base unit 12, as opposed to the target having the highest magnitude signal, can be determined. Push button switch 42, discussed above for use in the moving/same direction mode of operation, can be depressed causing the base unit to process the target return signals according to their frequency. More specifically, the target return signal with the highest frequency indicating the fastest speed is selected for further processing and is converted into the desired speed units. This allows the operator to track the fastest target with in a group of targets.

Rotary encoder/switch 41 described above, is also thumb operable, thereby allowing the operator to select and adjust the desired secondary functions of the radar system 10. In the preferred embodiment, these secondary functions include volume, range, self test initiation, power on/off, patrol blanking, and squelch and are displayed on the base unit 12.

The rotary encoder operates to rotate a selection pointer through a secondary functions menu. When the selection pointer is pointing to the secondary function selected for adjustment, the rotary encoder is depressed, thus acting like a switch and indicating the selection of the desired secondary function. Having selected the secondary function, the rotary encoder/switch 41 is again rotated by the operator's thumb to increase or decrease, for example, the volume. Upon reaching the desired level, the rotary encoder/switch 41 is depressed, thus locking the desired level and returning the user to the secondary function menu. These same steps are followed to control each of the secondary functions in the preferred embodiment. However, it should be appreciated that in accordance with the broadest aspects of the invention, other various types of input devices can be used to select and adjust the above-mentioned secondary functions, such as up/down push button switches.

To remove the handle assembly 11 from the base unit, forward force is applied to the rear face of the handle assembly to overcome the locking engagement of the detents 24 and the beads 25. Once disengaged, the handle assembly freely slides from channel 13. In this remote configuration, the handle assembly advantageously acts as a remote control device itself, providing complete control of the radar system 10. As described, this conversion from the hand-held mode of operation is easy and requires no extra control device, as heretofore required with the TV-type devices.

Additionally in the remote configuration trigger switch 45 includes the added ability to place the base unit in a continuous transmit mode. This is accomplished in the preferred embodiment of the present invention, by twice depressing switch 41 to the second position and subsequently releasing it to the first position in less than 100 milliseconds. This depress and release operation defines a click. In continuous transmit mode, a single click returns the base unit to standby mode.

In continuous transmit mode, just as described above for momentary transmit mode, the trigger switch 41 is depressed to the third position to lock the speed of a target being monitored. This action, however, must last longer than 100 milliseconds in the preferred embodiment or the controller will interpret the action as a click, thus returning the base unit to standby mode.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the radar system 10 may be of the type used at sporting events, as opposed to traffic radar systems, or in accordance with the broadest aspects of the present invention, the radar system described in detail may be any type of observation instrument.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly and equitably entitled.

We claim:

1. A handle assembly for attachment to, support and control of an observation instrument with a primary receiver for convertibility from a hand-held instrument to a remote instrument comprising:

a coupler to secure said handle assembly to provide the support of said observation instrument;

an input device to establish the operating parameters of said observation instrument;

a controller to generate a control signal based on the operating parameters established by said input device; and a primary transmitter to communicate the control signal to said observation instrument through said primary receiver, said handle assembly controls and supports said observation instrument in a hand-held mode or controls said instrument by remote control in a remote mode within range of said control signal.

2. The handle assembly of claim 1, wherein said input device includes at least one non-momentary switch.

3. The handle assembly of claim 2, wherein said controller includes control circuitry to receive the operating parameters from said at least one non-momentary switch and to generate the control signal for transmission to said observation instrument.

4. The handle assembly of claim 2, wherein said transmitter is an infrared transmitter and said receiver is an infrared receiver.

5. The handle assembly of claim 1, further comprising:

a secondary receiver to receive data from a secondary transmitter in said observation instrument; and a display, whereby data from said observation instrument when in the hand-held mode, or when in the remote mode within range may be received and displayed by said handle assembly.

6. The handle assembly of claim 5, wherein said transmitters are infra-red transmitters and said receivers are infra-red receivers.

7. The handle assembly of claim 5, wherein is further provided a peripheral device positioned within range having a compatible transmitter, whereby data from said peripheral device within range when in the remote mode may be received and displayed by said handle assembly.

8. The handle assembly of claim 1, wherein said observation instrument is a radar base unit for observing the speed of an object.

9. The handle assembly of claim 8, wherein said input device includes at least one non-momentary switch.

10. The handle assembly of claim 9, wherein said at least one non-momentary switch is a three position switch operable to select the mode of operation of said radar base unit, whereby a stationary, a moving same direction, or a moving opposite direction mode is selected and said radar base unit operates to determine the speed of a target dependent upon the selected mode of operation.

11. The handle assembly of claim 9, wherein said input device further includes a trigger type switch operable to select between standby mode in a first position and transmit mode in a second position, whereby said radar base unit momentarily transmits a radar signal dependent upon the position of said trigger type switch.

12. The handle assembly of claim 11, wherein said trigger type switch is further operable to select a continuous transmit mode of operation by remote control when in the remote mode within range of said control signal, whereby said radar base unit continuously transmits a radar signal.

13. The handle assembly of claim 12, wherein said trigger type switch is further operable to selectively lock the speed of a target as determined and displayed by said radar base unit, whereby the speed of said target is continuously displayed by said radar base unit.

14. The handle assembly of claim 9, wherein said input device further includes a push button switch, said push button switch enabling a fastest target mode when activated, whereby said radar base unit displays the speed of the fastest target from a group of targets.

15. The handle assembly of claim 9, wherein said input device further includes a rotary encoder switch, whereby the secondary functions of said radar base unit can be selected and adjusted.

16. The handle assembly of claim 8, wherein said controller includes control circuitry to receive the operating parameters from said at least one non-momentary switch and to generate the control signal for transmission to said radar base unit.

17. The handle assembly of claim 8, wherein said transmitter is an infra-red transmitter and said receiver is an infrared receiver.

18. The handle assembly of claim 8, further comprising:

a secondary receiver to receive data from a secondary transmitter in said radar base unit, whereby data from said radar base unit when in the hand-held mode, or when in the remote mode within range may be received and displayed by said handle assembly.

19. The handle assembly of claim 18, further comprising:

a display, whereby data from said radar base unit when in the hand-held mode, or when in the remote mode within range may be displayed by said handle assembly.

20. The handle assembly of claim 18, wherein said transmitters are infra-red transmitters and said receivers are infra-red receivers.

21. A velocity measurement radar system comprising:

a radar base unit with a primary receiver for convertibility from a hand-held system to a remote system; and a handle assembly for attachment to said radar base unit, said handle assembly controls said radar system in a hand-held mode or by remote control in a remote mode within range of said control signal.

22. The velocity measurement radar system of claim 21, wherein said handle assembly comprises:

a coupler to secure said handle assembly to said radar base unit;

an input device to establish the operating parameters of said radar base unit;

a controller to generate a control signal based on the operating parameters established by said input device; and a primary transmitter to communicate the control signal to said primary receiver, whereby said handle assembly controls said radar base unit when in the hand-held mode or by remote control when in the remote mode within range of said control signal.

23. The radar system of claim 22, wherein said input device of said handle assembly includes at least one non-momentary switch.

24. The radar system of claim 22, wherein said controller of said handle assembly includes control circuitry to receive the operating parameters from said at least one non-momentary switch and to generate the control signal for transmission to said radar base unit.

25. The radar system of claim 22, wherein said radar base unit further includes a controller to generate a data signal based on the velocity measured by said radar base unit; and a secondary transmitter to transmit said data signal; and said handle assembly further includes a secondary receiver to receive data from said secondary transmitter; and a display;

whereby said handle assembly receives and displays data from said radar base unit when in the hand-held mode, or when in the remote mode within range of said data signal.

26. The radar system of claim 25, wherein said radar base unit further includes a tertiary transmitter to transmit said data signal; and a tertiary receiver to receive said control signal, whereby the receipt and transmission of said signals is enhanced in the remote mode within range of said signals.

27. The radar system of claim 26, wherein said primary, secondary and tertiary transmitters are infra-red transmitters and said primary, secondary and tertiary receivers are infra-red receivers.

28. A method for converting an observation instrument with a primary reciever from a hand-held instrument to a remote instrument including the steps of:

removing a handle assembly having a primary transmitter and attached to an supporting said instrument;

mounting said instrument a distance from said handle assembly;

activating said observation instrument by remote control in a remote mode by transmitting a control signal from said transmitter to said reciever.

29. The method as claimed in claim 28, further comprising the steps of receiving data from said instrument; and displaying the data on said handle assembly.

30. The method as claimed in claim 28, wherein the step of activating said observation instrument includes the steps of:

establishing the operating parameters of said instrument; and generating a control signal based on the operating parameters of said instrument;

whereby said handle assembly controls said observation instrument by remote control when in the remote mode within range of said control signal.

31. The method as claimed in claim 30, wherein said observation instrument is a speed measurement radar system for observing the speed of an object.

32. The method as claimed in claim 31, wherein the step of establishing the operating parameters of said speed measurement radar system includes switching at least one non-momentary switch, whereby the remote mode of operation of said radar system is established.

33. The method as claimed in claim 32, wherein the step of establishing the operating parameters of said radar system further includes operating a trigger switch to select between standby mode in a first position, and momentary transmit mode in a second position, whereby said radar system momentarily transmits a radar signal dependent upon the position of said trigger type switch.

34. The method as claimed in claim 33, wherein the step of operating said trigger type switch further includes selecting a continuous transmit mode of operation, whereby said radar system continuously transmits a radar signal.

35. The method as claimed in claim 32, wherein the step of establishing the operating parameters of said radar system further includes enabling a fastest target mode, whereby the speed of the fastest target from a group of targets is displayed by said radar system.

36. The method as claimed in claim 32, wherein the step of establishing the operating parameters of said radar system further includes operating a rotary encoder switch to select a secondary function of said radar system and to adjust said secondary function.

37. The method as claimed in claim 31 further comprising the steps of receiving data from said radar system; and displaying said data on said handle assembly.

* * * * *